United States Patent [19]

Sozzi

[11] 3,962,464

[45] June 8, 1976

[54] PROCESS FOR PREPARING A BUTTER-LIKE DAIRY PRODUCT

[75] Inventor: Tomaso Sozzi, Lausanne, Switzerland

[73] Assignee: Societe d'Assistance Technique pour Produits Nestle S.A., Lausanne, Switzerland

[22] Filed: Mar. 18, 1974

[21] Appl. No.: 452,318

Related U.S. Application Data

[63] Continuation-in-part of Ser. No. 274,116, July 21, 1972, abandoned, which is a continuation-in-part of Ser. No. 49,989, June 25, 1970, abandoned.

[52] U.S. Cl. ............................... 426/43; 426/580; 426/581; 426/603
[51] Int. Cl.² ..................... A23C 15/12; A23C 7/00
[58] Field of Search ............ 426/43, 185, 340, 341, 426/580, 581, 603, 336

[56] References Cited
UNITED STATES PATENTS

| | | | |
|---|---|---|---|
| 2,085,134 | 6/1937 | Wendt | 426/185 |
| 3,266,904 | 8/1966 | Duin et al. | 426/189 X |
| 3,314,798 | 4/1967 | Graves | 426/185 |
| 3,407,075 | 10/1968 | Barker | 426/185 |
| R19,123 | 3/1934 | Wendt | 426/336 X |

OTHER PUBLICATIONS

McDowall The Buttermaker's Manual, 1953, New Zealand Press: Wellington, vol. I, p. 733, vol. II, pp. 1123–1126.

*Primary Examiner*—Joseph M. Golian
*Attorney, Agent, or Firm*—Blum Moscovitz Friedman & Kaplan

[57] ABSTRACT

A process for preparing a butter-like dairy product, which comprises the steps of pasteurising a cream containing not more than 40% by weight of fat, centrifuging the pasteurised cream and recovering a concentrated cream containing 50 to 65% by weight of fat, adding skimmed milk in quantity such as to reduce the fat content of the final product to between 47 and 56%, heating the cream to a temperature not exceeding 93°C in 5 to 60 seconds, adding 0.05 to 5.0% by weight of an acid substance in quantity such as to bring the pH of the final product to between 5.2 and 5.6, said temperature being such that immediately after acidification said cream is at at least 85°C, said acid substance being selected from the group consisting of an acid culture of a microorganism producing a butter flavor and an edible acid in combination with a butter flavor, cooling the resulting mixture to a temperature between about 2° and 10°C and holding the product at this temperature for at least 24 hours.

5 Claims, No Drawings

PROCESS FOR PREPARING A BUTTER-LIKE DAIRY PRODUCT

CROSS REFERENCE TO RELATED APPLICATION

This application is a continuation-in-part of my co-pending application Ser. No. 274,116 filed July 21, 1972 which in turn is a continuation-in-part of my application Ser. No. 49,989 filed June 25, 1970 and both now abandoned.

BACKGROUND OF THE INVENTION

This invention is concerned with a process for preparing a butter-like dairy product having a low fat content.

The traditional dairy product known as butter normally comprises about 83% by weight butterfat, with relatively small amounts of protein and lactose and the balance water. There is, however, a need for a butter-like dairy product having a low fat content for dietetic purposes, taking into account that the addition of non-dairy substances to butter is strictly governed by law in most countries and many additives are completely forbidden.

DESCRIPTION OF THE PREFERRED EMBODIMENTS

According to the invention, a process for preparing a butter-like dairy product comprises the steps of pasteurising a cream containing not more than 40% by weight of fat, centrifuging the pasteurised cream and recovering a concentrated cream containing 50% to 65% by weight of fat, adding skimmed milk in quantity such as to reduce the fat content of the final product to between 47 and 56%, heating the cream to between 85° and 93°C in 5 to 60 seconds, adding 0,05 to 5.0% by weight of an acid substance in quantity such as to bring the pH of the final product to between 5.2 and 5.6, said acid substance being selected from the group consisting of an acid culture of a microorganism producing a butter flavour and an edible acid in combination wih a butter flavour, cooling the resulting mixture to a temperature between about 2° and 10°C and holding the product at this temperature for at least 24 hours.

The acid substance is preferably an acid culture of a microorganism producing a butter flavour such as *Streptococcus diacetilactis*, *Streptococcus citrovorus* or *Streptococcus cremoris*. Alternatively, an edible acid may be added, with a butter flavour.

The process of the invention may readily be performed continuously, and it is simpler than traditional butter manufacture in that no churning is required.

The present invention provides a product which has a much lower fat content than ordinary butter, and hence a much lower calorie content and lower cost of manufacture, which may consist entirely of substances derived from milk or which are conventionally used in butter manufacture. The taste, colour and consistency closely resemble those of ordinary butter at normal room temperatures (of the order of 10° to 30°C) but the product has the advantage that it does not set to a hard mass at the temperatures found in a domestic refrigerator, so it is easy to spread without preliminary warming. It is whippable if mixed with an equal volume of milk or one third its volume of cold water. The product has excellent keeping qualities as it may be stored for at least six months at temperatures of 5°C or lower without detectable alteration in flavour, colour or bacteriological quality.

In carrying out the process, the cream is obtained from milk by skimming or by centrifuging. It preferably contains 25 to 40% by weight of fat, and should not be concentrated further at this stage because a thicker cream is likely to cause fat separation during pasteurisation. The cream is then pasteurised in conventional manner, for example to 65°C during 5 seconds in a tubular heat exchanger. This preliminary pasteurisation has the advantage of preventing the undesirable development of microorganisms and to make the cream more fluid, therefore more easy to handle in the subsequent steps.

The pasteurised cream is then concentrated by centrifugation. The purpose of the whole process being to obtain a final product having a fat content of between 47 and 56%, it is easiest to concentrate the pasteurised cream above these figures and to add skimmed milk afterwards to reach finally the desired fat content. The pasteurised cream is therefore concentrated to a fat content between 50 and 65%. Preferably, the skimmed milk recovered from a first centrifugation may be centrifuged and the cream separated therefrom added to the cream obtained by the first centrifugation. Thereafter, skimmed milk is added to the concentrated cream in quantity such as to reduce the fat content of the final product to between 47 and 56%. To compute this quantity, the fat content of the concentrated cream must be determined by the usual methods and account must be taken of the quantity of an acid substance which will be added in a later stage.

The concentrated cream is then brought in a relatively short time to 85°C at least and up to 93°C, this temperature depending on the quantity and temperature of later additions. Using a plate or tubular heat exchanger, the concentrated cream can be heated up to 93°C in 30 to 60 seconds, using a jacketed vessel in 5 to 20 seconds.

Immediately after this heat treatment, that is within 10 seconds for example, 0.05 to 5.0% by weight of an acid substance is added in quantity such as to bring the pH of the final product to between 5.2 and 5.6. This addition can occur at the outlet of the heat exchanger, within the jacketed vessel or after transfer to another container in said other container.

A preferred acid substance is 1 to 5% by weight of an acid culture of a microorganism producing a butter flavour such as *Streptococcus diacetilactis*, *Streptococcus citrovorus* or *Streptococcus cremoris*. Cultures of this kind may be obtained from a number of sources such as the National Institute of Research in Dairying of the University of Reading, England, and may be grown in a suitable nutrient such as milk. The acidity of the culture is measured by standard methods and the amount of culture to be added to the cream may be determined.

As mentioned before, the quantity of culture added must be taken into account when determining the quantity of skimmed milk to be added after concentration in order to obtain a final product with 47 to 56% fat content, and the quantity and temperature of the culture must be taken into account for the heat treatment in order that the cream is at 85°C at least after the culture addition. Due to this relatively high temperature the culture is then inactivated.

Instead of adding an acid culture, it is possible to add 0.05 to 0.2% by weight of an edible acid in combination with a butter flavour. Suitable edible acids are lactic, citric, ascorbic and tartaric acids as well as acid fruit concentrates. The butter flavour is preferably a distillate of a culture of a microorganism producing a butter flavour such as listed above. This kind of flavour is supplied commercially by the Chr. Hansen Laboratories in Copenhagen.

To prevent contamination, the product is preferably hot-filled, within 30 minutes for example, into appropriate sterile containers which are immediately sealed. The product is then cooled to a temperature between about 2° and 10°C and held at this temperature for at least 24 hours. Freezing should be avoided. It has been found that the flavour, aroma, colour and texture of butter develop within 24 to 36 hours at this temperature.

The following examples are given by way of illustration only. All percentages are by weight.

EXAMPLE 1

100 kg of fresh cream containing 35% fat, with a pH of 6.5, was pasteurised at 65°C during 5 seconds. It was then centrifuged, resulting in 52.800 kg cream with 60% fat content and 47.200 kg skimmed milk with 7% fat content. The latter was centrifuged, giving 9.440 kg cream with 35% fat content which was added to the 52.800 kg cream with 60% fat content. This resulted in 62.240 kg cream with 56.2% fat content, that is containing 34.979 kg fat or practically 35 kg for further calculations. The fat content of the final product being limited to 52%, its weight had to be $100 \times 35 : 52 = 67.370$ kg.

The acid culture added was one of *Streptococcus cremoris*, grown in partly skimmed milk with 9% fat content reconstituted from spray-dried milk and having a pH of 4.5. Adding 5% of this culture meant $67.370 \times 5 : 100 = 3.364$ kg of the same. This left 67.270 kg − (62.240 kg + 3.364 kg) = 1.766 kg of skimmed milk to be added after concentration to reach the desired fat content in the final product.

Hence, after concentration by centrifugation and addition of skimmed milk, the thus standardised cream was heated to 93°C in 30 seconds in a tubular heat exchanger and 3.364 kg of the above defined culture was added. The product was then hot-filled without delay in plastic pots which were immediately sealed and left to rest at 5°C for 24 hours. The product analysis gave 52% fat, 43.7% water, 4.3% solids non fat and a pH of 5.4.

EXAMPLE 2

The same quantity (100 kg) of cream with 35% fat was pasteurised and centrifuged as in Example 1, giving 62.240 kg cream with 56.2% fat content. As in the previous example, the total weight of the final product had to be 67.370 kg, leaving 5.130 kg for the addition of skimmed milk and acid substance. The latter was 1%, that is 0.673 kg of a citric acid aqueous solution at 10%, supplied by Merck A.G. in Darmstadt, and 1 per thousand, that is 0.067 kg of a distillate in aqueous solution of a culture used in butter manufacture and supplied by Chr. Hansen Laboratories in Copenhagen. The total weight of acid substance being 0.740 kg, 4.390 kg skimmed milk were therefore added after centrifugation. The thus standardised cream was heated to 90°C in 30 seconds in a tubular heat exchanger, the above mentioned quantity of citric acid solution and flavouring distillate added and the product hot-filled and cooled as in Example 1 with the same analysis results.

It is particularly significant that the finished product, a stable, fine dispersion of butterfat and water, is obtained without the application of dispersing techniques such as homogenisation or emulsification, and that no stabilising, dispersing, emulsifying or like agents are added.

EXAMPLE 3

100 kg of fresh cream containing 35% fat, with a pH of 6.5, was pasteurised at 65°C during 5 seconds. It was then centrifuged, resulting in 52.800 kg cream with 60% fat content. 0,900 kg skimmed milk with no fat content and 11,570 kg water was added. The thus standardised cream was heated to 90°C in 30 seconds in a tubular heat exchanger. 0,660 kg of a citric acid aqueous solution at 10% was added and 0,070 kg of a distillate in aqueous solution of a culture used in butter manufacture and supplied by Chr. Hansen Laboratories in Copenhagen. The product was hot-filled and cooled as in example I. The total weight of the final product was 66,000 kg. The product analysis gave 48% fat, 3,0% solids non fat and a pH of 5.4.

EXAMPLE 4

100 kg of fresh cream containing 35% fat, with a pH of 6.5, was pasteurised at 65°C during 5 seconds. It was then centrifuged, resulting in 52.800 kg cream with 60% fat content and 47.200 kg skimmed milk with 7% fat content. The latter was centrifuged, giving 9.440 kg cream with 35% fat content which was added to the 52.800 kg cream with 60% fat content. This resulted in 62.240 kg cream with 56.2% fat content. 1.59 kg skimmed milk with no fat content and 2.800 kg milk protein produced by ultrafiltration was added. The thus standardised cream was heated to 90°C in 30 seconds in a tubular heat exchanger. 0.673 kg of a citric acid aqueous solution at 10% was added and 0.067 kg of a distillate in aqueous solution of a culture used in butter manufacture and supplied by Chr. Hansen Laboratories in Copenhagen. The product was hot-filled and cooled as in Example 1. The total weight of the final product was 67.370 kg. The product analysis gave 52% fat, 8% solids non fat and a pH of 5.4.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. A process for preparing a butter-like dairy product which comprises the steps of pasteurising a cream containing not more than 40% by weight of fat, centrifuging the pasteurised cream and recovering a concentrated cream containing 50 to 60% by weight of fat, adding skimmed milk in quantity such that the fat content of the final product will be between 47 and 56%, heating the cream to between 85° and 93°C in 5 to 60 seconds, adding an acid substance in quantity such as to bring the pH of the final product to between 5.2 and 5.6, said addition being made under conditions such that the temperature of the product after said addition is at least 85°C, said acid substance being selected from the group consisting of an acid culture of a microorganism producing a butter flavour and an edible acid together with a butter flavour, cooling the resulting mixture to a temperature between about 2° and 10°C and holding the product at this temperature for at least 24 hours, the quantity of acid substance added when an acid culture being from 1 to 5% by weight and when an edible acid being from 0.05 to 0.2% by weight, said percentages being based on the weight of the final product.

2. A process according to claim 1 in which said microorganism is selected from the group consisting of *Streptococcus diacetilactis*, *Streptococcus citrovorus* and *Streptococcus cremoris*.

3. A process according to claim 1 in which said edible acid is selected from the group consisting of lactic, citric, ascorbic and tartaric acid and acid fruit concentrates.

4. A process according to claim 1 in which said butter flavour added with said edible acid is a distillate in aqueous solution of a culture used in butter manufacture.

5. The butter-like dairy product resulting from the process of claim 1.

* * * * *

UNITED STATES PATENT OFFICE
CERTIFICATE OF CORRECTION

PATENT NO. : 3,962,464
DATED : June 8, 1976
INVENTOR(S) : Tomaso Sozzi

It is certified that error appears in the above-identified patent and that said Letters Patent are hereby corrected as shown below:

Insert following the serial number in the left-hand column of the cover page the following:

[30] Foreign Application Priority Data

July 21, 1969   Switzerland............ 11,111/69

Signed and Sealed this

Seventh Day of December 1976

[SEAL]

Attest:

RUTH C. MASON
*Attesting Officer*

C. MARSHALL DANN
*Commissioner of Patents and Trademarks*